United States Patent [19]

Burns et al.

[11] Patent Number: 5,085,793
[45] Date of Patent: Feb. 4, 1992

[54] CORROSION-INHIBITED ANTIFREEZE/COOLANT COMPOSITION

[75] Inventors: Jeffrey M. Burns; John R. Sanderson; John M. Larkin; David R. McCoy, all of Austin, Tex.

[73] Assignee: Texaco Chemical Company, White Plains, N.Y.

[21] Appl. No.: 615,763

[22] Filed: Nov. 19, 1990

[51] Int. Cl.$^5$ .................. C09K 5/00; C23F 11/12
[52] U.S. Cl. .................... 252/79; 252/76; 252/396; 422/17
[58] Field of Search ............. 252/79, 76, 396; 422/7

[56] References Cited

U.S. PATENT DOCUMENTS

| | | | |
|---|---|---|---|
| 3,240,708 | 3/1966 | Dulat et al. | 252/79 |
| 4,234,440 | 11/1980 | Hirozawa et al. | 252/75 |
| 4,434,066 | 2/1984 | Lewis | 252/79 |
| 4,587,028 | 5/1986 | Darden | 252/79 |

Primary Examiner—Paul Lieberman
Assistant Examiner—Christine A. Skane
Attorney, Agent, or Firm—Robert A. Kulason; James J. O'Loughlin; Dominick G. Vicari

[57] ABSTRACT

A corrosion-inhibited antifreeze composition is disclosed. Specifically, the antifreeze composition comprises a major portion of a liquid alcohol freezing point depressant and a minor portion of at least one hydroxyl-substituted aromatic carboxylic acid having the hydroxyl radical disposed proximate to the carboxylic radical. The above described acid is employed as a corrosion inhibitor. Other conventional corrosion inhibitors may be employed in conjunction with the acids.

In another embodiment, the present invention relates to a process for inhibitig the corrosion of metals present in the cooling system of an internal combustion engine which comprises intimately contacting the metal surface to be inhibited against corrosion with the antifreeze composition described above. Most preferably, the target substrate is high lead solder.

14 Claims, No Drawings

CORROSION-INHIBITED ANTIFREEZE/COOLANT COMPOSITION

BACKGROUND OF THE INVENTION

1. Field of the Invention

This invention relates generally to a corrosion inhibitor and, more particularly, to the use of certain acids as corrosion inhibitors in aqueous solutions, such as an antifreeze/coolant composition.

2. Description of Background Art

Automobile engine cooling systems contain a variety of metals, including copper, solder (especially high lead solder), brass, steel, cast iron, aluminum, magnesium, and their alloys. The possibility of corrosive attack on such metals is high, due to the presence of various ions, as well as the high temperatures, pressures, and flow rates found in such cooling systems. The presence of corrosion products within the cooling system can interfere with heat transfer from the engine combustion chambers, which may subsequently cause engine overheating and engine component failure due to excess metal temperatures. See generally Fay, R. H., "Antifreezes and Deicing Fluids", *Kirk-Othmer Encyclopedia of Chemical Technology* (1978) Vol. 3, pp. 79-95.

Furthermore, there is a growing desire to reduce the heavy metal contamination of spent engine coolant, in order to substantially eliminate the hazards of handling it, which is necessitated by environmental considerations aimed towards safe disposal.

U.S. Pat. No. 4,851,145 describes a corrosion-inhibited antifreeze/coolant composition, wherein the corrosion inhibitor includes a combination of (a) an alkylbenzoic acid or the alkali metal, ammonium or amine salt thereof, (b) a $C_8$ to $C_{12}$ aliphatic monobasic acid or the alkali metal, ammonium or amine salt thereof; and (c) a hydrocarbyl triazole.

U.S. Pat. No. 4,587,028 describes non-silicate antifreeze formulations which include a corrosion inhibitor including an alkali metal salt of benzoic acid, an alkali metal salt of a dicarboxylic acid and an alkali metal nitrate.

U.S. Pat. No. 4,584,119 describes an antifreeze composition including the dibasic salt of naphthalene dicarboxylic acid and, optionally, a triazole as a corrosion inhibitor.

U.S. Pat. No. 4,389,371 describes an antifreeze composition which includes a corrosion inhibitor having an effective amount of a conventional corrosion inhibitor selected from the group consisting of the alkali metal carbonates, borax, the alkali metal dichromates, the alkali metal silicates, phosphorus acid, phosphoric acid, an alkali metal tungstate, benzotriazole, tolyltriazole, an alkali metal salt of benzoic or toluic acid, an alkali metal salt of a phenol, an alkanolamine and an organo-silicone compound in addition to an alkanolamine phosphate and a heterocyclic nitrogen-containing compound.

U.S. Pat. Nos. 4,342,596 and 4,233,176 describe a non-petroleum based metal corrosion inhibitor prepared from aliphatic monobasic acids, certain aromatic acids, a lubricant, amines and water.

U.S. Pat. Nos. 4,241,016; 4,241,014; 4,241,013; and 4,241,012 describe hydroxybenzoic acid in antifreeze compositions as a corrosion inhibitor.

U.S. Pat. No. 3,425,954 describes a corrosion inhibitor including a mixture of an alkali metal salt of aromatic carboxylic acids (sodium benzoate), an alkali metal salt of nitrous acid (sodium nitrite), an alkyl ester of benzoic acid (butyl benzoate) and a stable compound having a triazole function (benzotriazole). The composition is incorporated in a carrier vehicle, such as propylene glycol, and is adapted to inhibit the corrosion of metals in the presence of hydrogen sulfide and carbon dioxide by direct contact or as a vapor phase inhibitor.

U.S. Pat. Nos. 4,501,667, 4,402,907, and 4,366,076 describe alkylbenzoic acids, such as 4-tert-butylbenzoic acid are useful as metal corrosion inhibitors.

U.S. Pat. No. 4,552,678 describes a corrosion inhibitor obtained from the reaction product of a polyamine, an anhydride, and an organic acid of the formula $R_2$-COOH where $R_2$ may be H, a $C_1$ to $C_{12}$ alkyl, a $C_1$ to $C_5$ hydroxyalkyl, phenyl, tert-butyl, phenyl, or styryl radical.

U.S. Pat. No. 3,769,214 describes an aqueous lubricant composition containing a minor amount of a metal anti-staining agent and stability improver which is an alkanolamine salt of a carboxylic acid having at least 12 carbon atoms per molecule.

U.S. Pat. No. 2,832,742 describes the use of a blend of the diethanolamine salts of p-tert-butylbenzoic acid and a high molecular weight $C_7$ to $C_{18}$ aliphatic carboxylic acid mixture derived from an oxidized, petroleum fraction.

Japanese Patent No. 59208082 describes a method of inhibiting corrosion in a cooling water system for an internal combustion engine via addition of a corrosion inhibitor containing a water soluble amine salt of benzotriazole, a water soluble amine salt of t-butylbenzoic acid, a nitrite, and a benzoate to the cooling water.

U.K. Patent Application No. 2,122,598 describes a process and composition for resisting corrosion. The composition comprises (a) at least one $C_6$ to $C_{10}$ aliphatic carboxylic acid, (b) at least one $C_6$ to $C_8$ polyhydroxycarboxylic acid, and (c) at least one aromatic monocarboxylic acid, each of the acids being present as a salt with a salt-forming cation.

API Primary Petroleum Products Abstract No. 76-20709 describes French Patent No. 2268791, which discloses a water soluble ferrous metal corrosion inhibitor which is the condensation product of a $C_1$ to $C_6$ para-alkylbenzoic acid and an alkanolamine.

U.S. Pat. No. 4,497,702 describes amide reaction products of a polyalkylene polyamines and neo-acids. The reaction products are said to be useful to inhibit the corrosion of equipment in which petroleum or chemicals are produced or processed.

It is, therefore, my understanding that the use of the acids described herein as corrosion inhibitors in aqueous solutions, particularly antifreeze/coolant compositions, has heretofore been unknown; especially where the target substrate is high lead solder.

SUMMARY OF THE INVENTION

Accordingly, the present invention relates to a corrosion-inhibited antifreeze composition comprising a major portion of a liquid alcohol freezing point depressant and a minor portion of at least one hydroxyl-substituted aromatic carboxylic acid, said acid having the hydroxyl radical disposed proximate to the carboxyl radical.

In another embodiment, the present invention relates to a process for inhibiting the corrosion of metals present in the cooling system of an internal combustion engine which comprises intimately contacting the metal surface to be inhibited against corrosion with the antifreeze composition described above.

Advantageously, since the corrosion-inhibited antifreeze composition of this invention affords excellent lead protection, the environmental detriments of spent antifreeze compositions are drastically minimized.

DESCRIPTION OF THE PREFERRED EMBODIMENTS

The novel corrosion inhibitor of the present invention comprises at least one of the acids described above used alone or in combination with conventional corrosion inhibitors.

The acids used in accordance with the present invention are hydroxyl-substituted aromatic carboxylic acids. More specifically, it has been discovered that where the hydroxyl radical, OH, is proximate to the carboxyl radical, COOH, favorable anti-corrosive properties are exhibited by the aromatic carboxylic acid; especially when employed in an antifreeze/coolant composition. By way of illustration, as shown below, 2-hydroxybenzoic acid is representative.

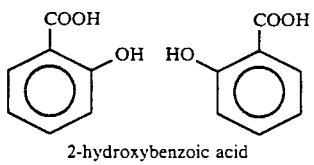

2-hydroxybenzoic acid

Another aromatic carboxylic acid where the hydroxyl radical is disposed proximate to the carboxyl radical is mandelic acid:

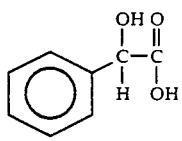

Certain di-carboxylic acids function well as the corrosion-inhibitor of this invention; homophthalic acid is representative:

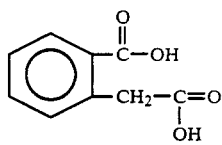

Therefore, for purposes of this description and the claims which follow, the terminology "hydroxyl-substituted aromatic carboxylic acids having the hydroxyl radical disposed proximate to the carboxyl radical" or terminology of similar import is intended to encompass di-carboxylic acids which meet the foregoing criteria, such as alpha carboxy carboxylic acids. In particular, where the primary and secondary carboxyl groups are disposed proximate to each other, the OH segment (CO[OH]) of one of the groups is to be regarded as a hydroxyl group when used herein.

It is believed that the improved corrosion inhibition exhibited by the acids described above is ascribed to the proximity of the carboxyl group to the hydroxyl group. More specifically, the acid group attaches to the surface of the metal to be protected, while the hydroxyl group provides a beneficial electron density.

The conventional corrosion inhibitors referred to above can include alkali metal borates, alkali metal silicates, alkali metal benzoates, alkali metal nitrates, alkali metal nitrites, alkali metal molybdates, hydrocarbyl thiazoles and mixtures thereof.

An additional corrosion inhibitor which may optionally be employed in admixture with one or more of the acids described above includes $C_8$ to $C_{12}$ aliphatic dibasic acid or the alkali metal, ammonium, or amine salt of said acid. For instance, the foregoing acids or salts can include one or more of the following: suberic, azelaic, sebacic, undecanedioic, dodecanedioic, the diacid of dicyclopentadiene, terephthalic and mixtures thereof. Sebacic acid is particularly preferred. Any alkali metal, ammonium, or amine may be used to form the dibasic acid salt; however, alkali metals are preferred. Sodium and potassium are the preferred alkali metals for use in forming the dibasic acid salt.

In the case where one or more of the acids are used in combination with the conventional and/or additional corrosion inhibitors referred to above, the resulting corrosion-inhibited antifreeze/coolant formulations can include from about 0.1 to about 5 weight percent of the acid(s) component and from about 0.1 to about 5 weight percent of the other component. Preferably, the resulting antifreeze coolant composition will include from about 1 to about 2 weight percent of the acid(s) component and from about 0.75 to about 1.25 weight percent of the other component.

The corrosion inhibitor of the instant invention will most typically be employed in antifreeze formulations as coolants for internal combustion engines. While the present corrosion-inhibitor substantially eliminates the corrosion of all metals found in engine cooling systems, it is particularly well suited for eliminating the corrosion of high lead solder and aluminum. Other applications may include hydraulic fluids, aqueous cutting oils, paints, soluble oils, metal cutting fluids, aircraft deicers, and greases. In these applications, the monobasic and dibasic acid salts may be formed with metal hydroxides including sodium, potassium, lithium, barium, calcium, and magnesium.

In one embodiment of the instant invention, the above-described corrosion-inhibitor, whether it be one or more of the present acids alone or in combination with the other corrosion inhibitors described above, is employed in admixture with water to form a corrosion-inhibited aqueous composition.

In a preferred embodiment of the instant invention, the above-described corrosion inhibitor is employed in admixture with a liquid alcohol freezing point depressant to form a novel antifreeze/coolant concentrate composition for use in the cooling systems of internal combustion engines. The antifreeze/coolant concentrate composition comprises from about 80 to about 99, preferably from about 90 to about 99 weight percent of a water soluble liquid alcohol freezing point depressant and from about 20 to about 1 weight percent of the instant corrosion inhibitor.

The liquid alcohol freezing point depressant component of the above-described antifreeze/coolant concentrate composition may be a glycol or glycol ether. The glycol ethers which may be employed as major components in the instant invention include glycols, such as ethylene glycol, diethylene glycol, propylene glycol, dipropylene glycol; and glycol monoethers, such as the methyl, ethyl, propyl, and butyl ethers of ethylene glycol, diethylene glycol, propylene glycol, and dipropylene glycol. Ethylene glycol is particularly preferred as the liquid alcohol freezing point depressant component.

In another embodiment of the instant invention, the above-described corrosion-inhibited antifreeze/coolant concentrate composition is diluted with about 10-90 volume percent, preferably about 25-75 volume percent of water.

The following Examples I-III are provided to further illustrate specific embodiments of the present invention; they should not be construed as limiting the present invention in any way.

EXAMPLES I-III

In Examples I-III, three (3) corrosion-inhibited antifreeze/coolant compositions of the present invention were prepared. In Example IV, a control non-inventive antifreeze/coolant composition was prepared for comparative purposes. In all of the examples, the compositions were prepared by combining the components identified below in Table I. Each of the components were mixed at room temperature ($\pm 30°$ F.) and at a pressure between 27 to 33 inches of mercury. Ethylene glycol was charged into a mixing vessel and was agitated while the remaining components were added in the following order: sodium hydroxide, tolyltriazole, deionized water, and the acid components.

TABLE I

| Component | Weight Percent Example No. | | | |
|---|---|---|---|---|
| | I | II | III | IV |
| Ethylene Glycol | 93.38 | 93.3 | 92.098 | 95.5 |
| NaOH (50% by weight in deionized water) | 1.6 | 1.6 | 2.4 | 0.8 |
| Sebacic Acid | 1.0 | 1 | 1 | 1.0 |
| Deionized Water | 2.5 | 2.5 | 2.5 | 2.5 |
| Tolyltriazole | 0 | 0.2 | 0.2 | 0.2 |
| Mandelic Acid | 1.52 | 0 | 0 | 0 |
| 2-hydroxybenzoic Acid | 0 | 1.4 | 0 | 0 |
| Homophthalic Acid | 0 | 0 | 1.8 | 0 |

The corrosion behavior of the antifreeze/coolant compositions prepared in Examples I-IV were tested according to the ASTM D-1384 Glassware Corrosion Test, incorporated herein by reference. Table II sets forth the results obtained. The smaller the weight loss of the metal coupon, the greater the corrosion inhibiting properties of a particular formulation. A negative weight loss signifies a weight increase due to the formation of a protective coating on the coupon.

TABLE II

| Metal/Metal Alloy | Example No. | | | |
|---|---|---|---|---|
| | I | II | III | IV |
| Copper | 92 | 4 | 3 | 1 |
| High Lead Solder | 8 | −3 | −1 | 120 |
| Brass | 17 | 5 | 2 | 0 |
| Sn/Pb Solder | 0 | −1 | 0 | −3 |
| Steel | −4 | −1 | 0 | −1 |
| Iron | 28 | 389 | 2 | −2 |
| Aluminum | 33 | 71 | 11 | 175 |

As these data demonstrate, the antifreeze/coolant composition of the present invention (Examples I-III) exhibits excellent corrosion protection for high lead solder and favorable corrosion protection for aluminum. Advantageously, the corrosion-inhibited antifreeze/coolant compositions of the present invention provide improved protection of cooling system components and reduce the amount of hazardous ions that would ordinarily be contained in spent engine coolant. It is vital that cooling system metals remain in a substantially new condition for the cooling system to function properly. More particularly, corrosion can reduce heat transfer, lead to leakage, decrease flow, and dramatically reduce engine efficiency and durability. Lead is the major contaminant that can turn environmentally friendly biodegradable ethylene glycol based engine coolant into hazardous waste, according to EPA standards. Accordingly, reducing the problems of corrosion and, hence, heavy metal contamination (especially lead) is a significant contribution to the art.

What is claimed is:

1. A corrosion-inhibited antifreeze composition consisting of from about 80 to about 99 weight percent of a liquid alcohol freezing point depressant and from about 20 to about 1 weight percent of at least one hydroxyl-substituted aromatic carboxylic acid, said acid having the hydroxyl radical disposed proximate to the carboxyl radical.

2. The antifreeze composition of claim 1 wherein said freezing point depressant is selected from the group consisting of ethylene glycol, diethylene glycol, propylene glycol, dipropylene glycol and monoethers of said glycols.

3. The antifreeze composition of claim 1 wherein said at least one hydroxyl-substituted aromatic carboxylic acid is selected from the group consisting of 2-hydroxybenzoic acid, mandelic acid and homophthalic acid.

4. A process for inhibiting the corrosion of metals present in the cooling system of an internal combustion engine which comprises intimately contacting the metal surface to be inhibited against corrosion with the antifreeze composition of claim 1.

5. The process of claim 4 wherein said metal is high lead solder.

6. A corrosion-inhibited antifreeze composition consisting of from about 80 to about 99 weight percent of a liquid alcohol freezing point depressant and from about 20 to about 1 weight percent of a corrosion inhibitor, said corrosion inhibitor being selected from the group consisting of 2-hydroxybenzoic acid, mandelic acid and homophthalic acid.

7. A corrosion-inhibited antifreeze composition comprising from about 80 to about 99 weight percent of a liquid alcohol freezing point depressant and from about 20 to about 1 weight percent of a corrosion inhibitor, said corrosion inhibitor consisting of (a) at least one hydroxyl-substituted aromatic carboxylic acid, and (b) member selected from the group consisting of alkali metal borates, alkali metal silicates, alkali metal benzoates, alkali metal nitrates, alkali metal nitrites, alkali metal molybdates, hydrocarbyl thiazoles and mixtures thereof, a $C_8$–$C_{12}$ aliphatic dibasic acid or the alkali metal, ammonium or amine salt of said acid.

8. The antifreeze composition of claim 7 wherein said aliphatic dibasic acid is selected from the group consisting of suberic, azelaic, sebacic, undecanedioic, dodecanedioic, the diacid of dicyclopentadiene, terephthalic and mixtures thereof.

9. The antifreeze composition of claim 7 wherein said at least one hydroxyl-substituted aromatic carboxylic acid is employed in an amount of about 0.1 to about 5 weight percent and said second corrosion inhibitor is employed in an amount of about 0.1 to about 5 weight percent.

10. The antifreeze composition of claim 7 wherein said at least one hydroxyl-substituted aromatic carboxylic acid is employed in an amount of about 1 to about 2 weight percent and said second corrosion inhibitor is employed in an amount of about 0.75 to about 1.25 weight percent.

11. The antifreeze composition of claim 7 wherein said at least one hydroxyl-substituted aromatic carboxylic acid is employed in an amount of about 0.1 to about 5 weight percent and said second corrosion inhibitor is employed in an amount of about 0.1 to about 5 weight percent.

12. The antifreeze composition of claim 7 wherein said at least one hydroxyl-substituted aromatic carboxylic acid is employed in an amount of about 1 to about 2 weight percent and said second corrosion inhibitor is employed in an amount of about 0.75 to about 1.25 weight percent.

13. A process for inhibiting the corrosion of metals present in the cooling system of an internal combustion engine which comprises intimately contacting the metal surface to be inhibited against corrosion with the antifreeze composition of claim 6.

14. The process of claim 13 wherein said metal is high lead solder.

* * * * *